3,614,931
HYDRAULIC SWAY STABILIZER
Franklin P. Adler, 105 Boyd Circle,
Michigan City, Ind. 46360
Filed May 12, 1969, Ser. No. 823,795
Int. Cl. B61f 5/14, 5/16, 5/24
U.S. Cl. 105—199 A
7 Claims

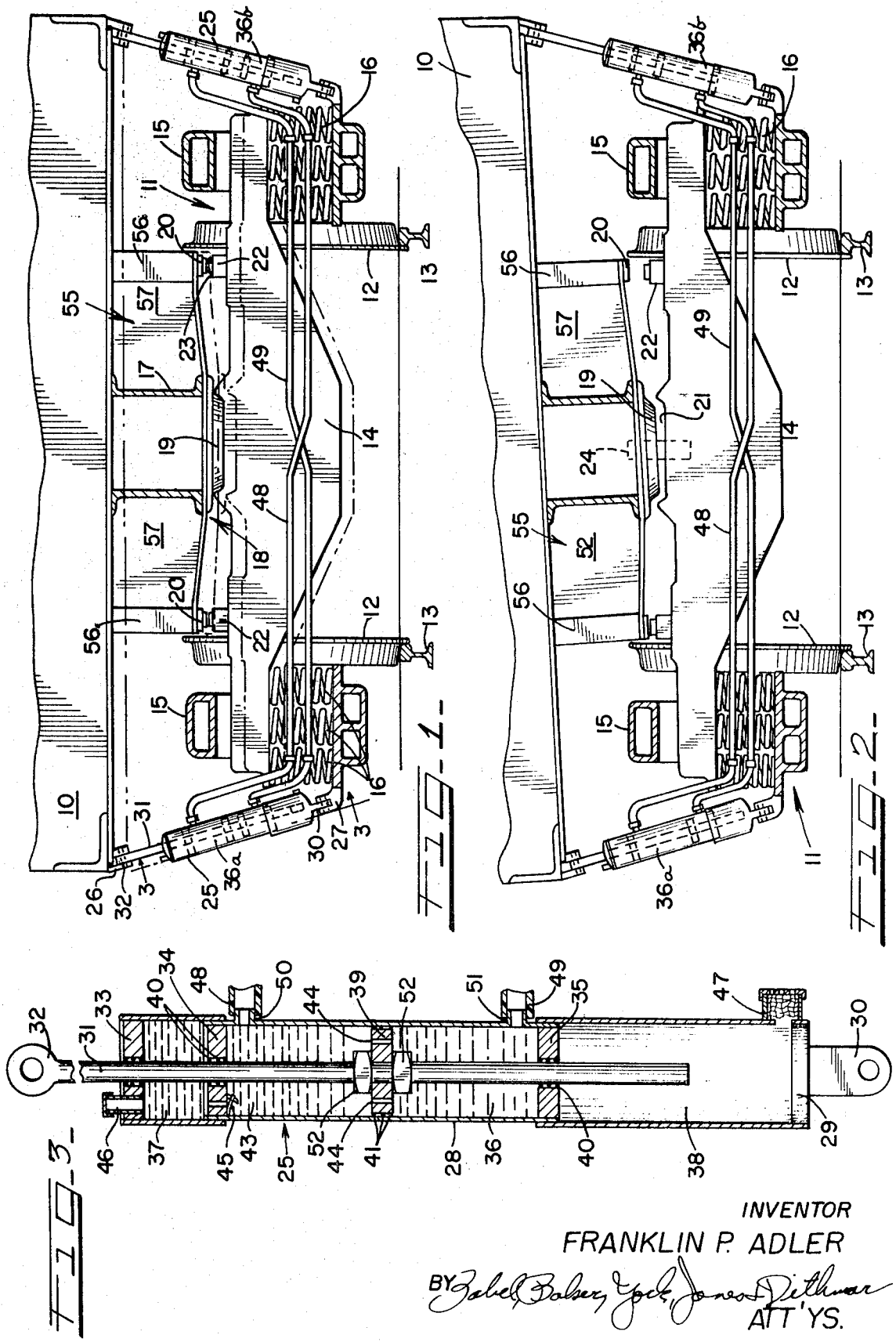

ABSTRACT OF THE DISCLOSURE

A sway stabilizer for a railway car including a shock absorber which extends between the car body and the side frame at each side of the car truck. A conduit extends from the upper end of the chamber of the left shock absorber to the lower end of the chamber of the right shock absorber. A second conduit extends from the lower end of the left shock absorber chamber to the upper end of the right shock absorber chamber. The cross sectional area of the conduit is much greater than the sum of the areas of the several by-pass orifices in the piston. The piston rod extends through both end members of the chamber.

---

This invention relates to a sway stabilizer device for freight cars and other rolling stock.

There has been a tendency in recent years to build larger capacity freight cars, as a result of which the center of gravity of the car is considerably higher than in the case of the usual 70-ton box car. As a result, the sway of the car from side to side due to track irregularities is more noticeable, and where the natural period of sway coincides with rail joints, a dangerous oscillation occurs which could result in derailment or capsizing of the car. This is sometimes referred to as "harmonic roll."

In the case of 50-foot super-cars of 100 to 150 ton capacity, this may occur at from 15 to 25 miles per hour, and if the train is running on bad track, it is difficult to increase the speed to a point where the oscillation diminishes.

In order to mitigate this situation, various sway control devices have been proposed in recent years. One of such control devices is a two-way hydraulic shock absorbing cylinder which absorbs sufficient energy as to reduce the frequency of the sway or roll to a safe value. However, such hydraulic shock absorbers have the disadvantage of being relatively short lived; their average life is about a year in ordinary service, and they may require replacement in five or six months when in continuous service, such as encountered in a unit train.

Replacement is costly, amounting to about $500 per car set for the material, plus labor and the cost of down time when the car is out of service. Thus in a unit train of 100 to 150 cars, the annual cost of shock absorber maintenance and replacement is very substantial.

According to my invention, I have found that the life of a hydraulic shock absorber can be extended very substantially, say of the order of two or three times, if it is designed for a selective action, in that it is operative to absorb energy arising from roll or sway, but in operative to absorb energy arising from vertical movements.

It can be demonstrated that in normal operation, a car is subjected to at least as much vertical movement as it is to sway movement. Therefore, if a shock absorber could be provided which filters out the piston travel due to vertical car movement, its life would be correspondingly extended.

The main causes of shock absorber failure are loss of pressure due to wear of the packing rings around the piston rod, and loss of pressure due to wear of the piston rings. Wear of the metal at the hinge points develops play, which reduces effectiveness. However, I have found that the amount of wear at these points is greatly reduced if the pressure is relieved. For instance, if the piston were freely movable within the cylinder, without any substantial resistance, there would be very little wear at the points of metal to metal contact, such as the piston or cylinder eye with the mounting brackets; there would be very little wear at the packing rings for the piston rod, or the piston rings. In other words, when the hydraulic fluid is under pressure, the packing is compressed by the hydraulic fluid and tends to flow against the piston rod or against the cylinder wall in order to make the desired seal, and piston travel where the packing is thus compressed results in wear. Piston travel when the packing is not compressed does not result in any appreciable wear, since the parts are well lubricated by the hydraulic fluid.

Thus, even though the cumulative piston travel is not reduced, if only a portion of the piston travel occurs in a pressurized environment, then the amount of wear will be substantially reduced, and the life of the shock absorber will be correspondingly extended.

According to my invention, the foregoing is accomplished by providing communication between the right and left shock absorbers at either end of the car. The upper end of one cylinder is connected to the lower end of the other, and vice versa by a low resistance communication means, such as as a conduit. Thus with respect to vertical movement, the hydraulic fluid at the bottom of one cylinder will not be forced through the restricted orifice of the shock absorber on a relative down movement of the car body for the reason that if both pistons are displaced to an equal extent, the fluid from the lower half of the first cylinder flows into the upper half of the second cylinder at the same time that the fluid in the lower half of the second cylinder is flowing to the upper half of the first cylinder. Thus, the end of the body is free for vertical movement with respect to the axle under the influences of the forces involved, including the bolster springs.

However, with respect to roll or side sway, if it is assumed that the forces acting on each cylinder are equal but opposite, then the pressure developed in the lower half of the first cylinder will be equal to the pressure developed in the upper half of the second cylinder with the result that there will be no flow of liquid through the conduit, and the negative pressure on the upper half of the first cylinder will be offset by the then negative pressure on the lower half of the second cylinder. Therefore, the hydraulic fluid is forced through the restricted orifice in the piston, which means that the cylinder is performing the shock absorbing function.

Therefore, according to my arrangement, the shock absorbers are functional only with respect to side sway or roll, but perform no energy absorbing function with respect to vertical movement wherein both the right and left side of the car have equal motion in the same direction.

Other objects, features and advantages will become apparent as the description proceeds.

In the drawings:

FIG. 1 is a fragmentary transverse section of a railway car embodying my invention, the axle being omitted for clarity, and showing a changed position in broken lines;

FIG. 2 is a view similar to FIG. 1, but showing a different changed position;

FIG. 3 is a section through one of the shock absorbers, taken along line 3—3 of FIG. 1.

In the drawings, the railway car comprises a body 10 having a center sill 17, and a truck 11 at each end having wheels 12 which ride on rails 13. In the views taken, only one truck appears but the other truck is substantially identical to that shown. Each truck includes a bolster 14, the ends of which extend into openings in the side frames 15, and are suported by bolster springs 16 which spring the weight of the car and contents.

The body 10 is supported on a truck 11 by pivot means 18 so as to permit relative pivoting or turning movement of a truck about a vertical axis. This pivot means 18 comprises a downwardly projecting body center plate 19 and side bearings 20 and a recessed truck center plate 21 and side bearings 22. The body center plate 19 is circular and extends into the circular recess of the truck center plate 21, both being located along the longitudinal axis of the car. The body side bearing 20 is a steel strip about 4 inches wide and 14 inches long, mounted on the outer lower edge of a fabricated structure 55, the details of which are standard and are not shown herein. For instance, the portion above the strip 20 may be a vertically extending I-beam 56; one or more webs 57 connect same with the center sill 17. The truck side bearing 22 may be in the form either of a wear plate, or a roller.

When in the normal solid line position FIG. 1, there is a small clearance 23, such as one-quarter inch, between each set of side bearings. This clearance is standard; where a resonant or harmonic roll develops however, the free movement of the car body with respect to the truck bolster 14 aggravates the side sway problem. A loosely located guide pin 24, received in a socket formed in the bolster, serves as a guide to permit centering of the pivot means in an extreme roll condition wherein the center plates 19 and 21 becomes separated, as shown in FIG. 2.

On either side of the truck there is a double acting hydraulic shock absorber 25 extending between a bracket 26 on the body 10 and a bracket 27 on each side frame 15. The shock absorber comprises a cylinder 28 having a bottom member 29 which terminates in any eye or link end 30.

Extending into the cylinder 18 from the upper end is a piston rod 31 having at its upper end an eye or link end 32. The link ends 30 and 32 are linked to the brackets 27 and 26 respectively, by suitable pins or bolts to permit a universal movement in each direction so that there will be no binding at either link connection.

As shown in FIG. 3, the shock absorber also includes a top closure 33, and two immediate walls which may be referred to as the upper end 34 and the lower end 35 of the cylinder. These cylinder ends define a chamber 36 above which is a reservoir 37 and below which is a free space 38 into which the end of the piston rod 31 extends.

A piston 39 is located within the chamber 36 and is secured to the piston rod 31.

Suitable packing rings 40 are provided at the points where the piston rod 31 passes through the top closure 33 and the cylinder ends 34 and 35. Suitable piston rings 41 are provided for the piston 39.

By-pass means are provided between the upper part of the chamber 36 and the lower part thereof so as to permit movement of the piston and the piston rod under the forces encountered when the cylinder is filled with a suitable hydraulic fluid 43. In the embodiment shown, the by-pass means comprises one or more passageways 44 extending through the piston 39 and which constitute orifices which restrict the flow of fluid in a well known manner so as to control the rate of piston travel.

Fluid 43 which is disposed in the reservoir 37 may pass into the chamber 36 through a check valve 45 to replenish any fluid that may be lost. A filling plug 46 is provided in the top closure 33.

By virture of the construction shown, in which the free end of the piston rod 31 extends through the cylinder end 35 and into the free space 38, the volume of fluid disposed within the chamber 36 is constant at all times. A breather 47 is provided in the side wall of the free space chamber 38 to equalize the air pressure therein with the atmosphere.

Thus it will be seen that a downward movement of the left corner of the car body 10 will tend to be transmitted directly to the left side frame 15. However the orifice or restrictive passageways 44 permit a controlled movement of the piston 39 and hence of the car body 10 with respect to the cylinder 28 and side frame 15. As a result, the downward movement of the left end of the bolster 14 against the compressive force exerted by the bolster springs 16 takes place at a considerable slower rate than that which would occur if the shock absorber 25 were not present.

In accordance with my invention, I provide means for rendering the two shock absorbers 25 of each truck 11 inoperative with respect to translational movement of the car body in a vertical direction, but which does not reduce the effectiveness of the shock absorbers with respect to the roll, or rotational movement about a longitudinal axis.

Such means comprises two separate communication means providing a cross connection between the uper and lower ends of the respective shock absorbers. In describing these communication providing means, the chamber of the left hand shock absorber 25, as viewed in FIG. 1 is identified by the reference numeral 36a, and the chamber of the right hand shock absorber 25 is identified by the reference numeral 36b. One such communication providing means is the conduit 48 which extends from the upper part of the chamber 36a to the lower part of the chamber 36b. The other communication providing means is a conduit 49 which extends from the lower part of the chamber 36a to the upper end of the chamber 36b.

As shown in FIG. 3, the wall of each chamber 36 is provided with an upper nipple 50 and a lower nipple 51 which provides the connection for the conduits 48 and 49, respectively. The piston rod 31 is provided with nuts 52 on either side of the piston 39 which not only secure the piston to the piston rod, but also limit the movement of the piston so that it will not overlap either nipple 50 or 51.

When side sway or roll occurs, which is to say, when the car body and bolster 14 rotate in a counterclockwise direction on the springs 16 so that the left hand shock absorber 25 tends to contract, the condition will be as previously described, but at the same time the right hand portion of the car moves upwardly which tends to elongate the right hand shock absorber 25. This condition of the parts is shown in FIG. 2. Here it will be apparent that the hydraulic pressure in the chamber 36a is increased at the lower part and at the same time there is a roughly comparable increase in the hydraulic pressure in the upper part of the chamber 36b. These high pressure parts of the two chambers are connected by the conduit 49, but there will be no or relatively little flow of the hydraulic fluid through the conduit 49 because of the substantially equal pressures. Similarly, the lower pressure parts of the chambers 36a and 36b are connected by the conduit 48, so there will be little or no flow of fluid through this conduit because the pressures are substantially equal. Thus the shock absorbers 25 are effective to dampen the rotational movement of the car body to an extent where the development of a harmonic roll at a certain speed will be prevented.

On the other hand, when the relative movement of the car body and the axle is purely translational in the vertical direction as indicated by the broken lines in FIG. 1, the cross connected conduits 48 and 49 provide a substantial equalization of the pressure as between the upper and lower parts of each chamber. More specifically, in FIG. 1, downward movement of the car body as a whole will increase the fluid pressure in the lower part of the chamber 36a, but at the same time it decreases the pressure in the upper part of the chamber 36b. Therefore, the fluid will flow from one shock absorber to the other from left to right, through the conduit 49. At the same time the increase in the pressure in the lower part of the chamber 36b will be relieved by the flow of the hydraulic fluid from right to left through the conduit 48 to the upper part of the chamber 36a, which is the low pressure side of the piston 39.

The effective cross section of each conduit 48, 49 is many times greater than the sum of the effective orifice cross sections provided by the plurality of the by-pass orifices 44 in one of the pistons 39. Hence, the by-pass orifices 44 are rendered non-functional under these conditions with the result that the rate of piston travel is determined by other conditions, such as the resilience of the bolster springs 36 and the mass of the car body and contents.

As a result of this selective action, there will be practically no wear of the packing rings 40 and piston rings 41 due to translational movements of the car body in the vertical direction, thus prolonging the life of the shock absorbers very substantially.

Of course, car sway in most instances will be a combination of translation and rotation, but with the rotation predominant. Thus there may be small amounts of fluid flow through the conduits 48 and 49 during car sway, but this does not interefere with the dampening action provided by my invention with respect to roll. Similarly, car bounce may be a combination of translation and rotation, with translation predominating. The dampening effect exerted by the shock absorbers on the rotational component not only is of minor significance but the pressures developed are correspondingly minor with the result that the life of the shock absorber is not materially reduced over theoretical conditions in which the car bounce would be purely translation movement.

What is claimed is:

1. A sway stabilizer device for a railroad car having a body, a truck at one end of said body having a bolster supporting said body, a pair of side frames, and springs disposed between said bolster and said side frames for taking up the weight of said body, said sway stabilizer device comprising hydraulic shock absorbing means extending between said body and each side frame at each side of said truck, and closed cross connection means connecting said hydraulic shock absorbing means for rendering said hydraulic shock absorbing means non-functional with respect to translational movement of said car body in a vertical direction.

2. A sway stabilizer device as claimed in claim 1 in which said hydraulic shock absorbing means comprise two double acting hydraulic cylinders, each providing a chamber, a piston slidably disposed in each chamber and dividing same into an upper part and a lower part, by-pass means including an orifice connecting said upper and lower parts of each chamber for permitting fluid flow from one part to the other to control the rate of the sliding movement of each piston, said closed cross connection means comprising a first means providing closed communication between the upper part of the chamber of one cylinder and the lower part of the chamber of the other cylinder, and a second means providing closed communication between the lower part of the chamber of said one cylinder and the upper part of the chamber of said other cylinder, each of said first and second means being effective to transmit the full pressure from one chamber part to its associated chamber part so the pressure differential between the chamber parts connected by said first means and the chamber parts connected by said second means will be maintained during sway and so that said by-pass means will be rendered functional with respect to rotational movement of said car body with respect to said truck.

3. A sway stabilizer device as claimed in claim 2 in which each hydraulic cylinder includes an upper end member for said chamber and a lower end member, a piston rod extending through both of said end members whereby the capacity of said chamber is constant for all positions of said piston, said piston being secured to said piston rod at a point between the ends thereof.

4. A sway stabilizer device as claimed in claim 3 in which each hydraulic cylinder includes a reservoir located above said chamber, an enclosed free space located below said chamber, and a check valve located in said upper end member for permitting fluid to flow downwardly from said reservoir into said chamber to replenish fluid lost by leakage, and preventing upward flow of fluid through said check valve, the lower end of said piston rod being disposed in said enclosed free space.

5. A sway stabilizer device as claimed in claim 2 in which said by-pass means comprises a passageway extending through each piston.

6. A sway stabilizer device as claimed in claim 2 in which each of said communication providing means comprises a conduit, and each by-pass means comprises a plurality of passageways extending through a piston, the cross sectional area of each conduit being considerably greater than the sum of the cross sectional areas of the passageways of one piston.

7. A sway stabilizer device for a railroad car having a body, a truck at one end of said body having a bolster supporting said body, a pair of side frames, and springs disposed between said bolster and said side frames for taking up the weight of said body, said sway stabilizer device comprising two double acting hydraulic cylinders, one at each side of said truck, means linking the upper end of each cylinder to an associated side of the car body and the lower end of each cylinder to its associated side frame, each cylinder comprising a chamber, a piston slidably disposed in each chamber and dividing same into an upper part and a lower part, by-pass means including an orifice connecting said upper and lower parts of each chamber for permitting fluid flow from one part to the other to control the rate of the sliding movement of each piston, a first conduit providing closed communication between the upper part of the chamber of one cylinder and the lower part of the chamber of the other cylinder, and a second conduit providing closed communication between the lower part of the chamber of said one cylinder and the upper part of the chamber of said other cylinder, said first and second conduits substantially equalizing the pressures in the said upper and lower parts of each chamber when the pressures in both of said upper parts are substantially equal to each other, whereby said by-pass means are rendered non-functional with respect to translational movement of said car body in the vertical direction.

References Cited

UNITED STATES PATENTS

| | | | |
|---|---|---|---|
| 2,093,486 | 9/1937 | Schoepf et al. | 105—199 |
| 2,474,471 | 6/1949 | Dolan | 105—199 X |
| 2,936,860 | 5/1960 | Peras | 188—94 |
| 2,960,289 | 11/1960 | Westcott, Jr. | 244—104 |
| 3,376,830 | 4/1968 | Bingham | 105—199 X |
| 3,459,139 | 8/1969 | Love | 105—199 |
| 3,486,466 | 12/1969 | Rodgers | 105—199 |

ARTHUR L. LA POINT, Primary Examiner

H. BELTRAN, Assistant Examiner

U.S. Cl. X.R.

105—164, 453; 188—94